US012809064B2

(12) United States Patent
Hoshi

(10) Patent No.: US 12,809,064 B2
(45) Date of Patent: Nov. 24, 2026

(54) SPECTACLE LENS

(71) Applicant: HOYA LENS THAILAND LTD., Pathumthani (TH)

(72) Inventor: Yuji Hoshi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 357 days.

(21) Appl. No.: 18/284,940

(22) PCT Filed: Mar. 31, 2022

(86) PCT No.: PCT/JP2022/016607
§ 371 (c)(1),
(2) Date: Sep. 29, 2023

(87) PCT Pub. No.: WO2022/211044
PCT Pub. Date: Oct. 6, 2022

(65) Prior Publication Data

US 2024/0199891 A1 Jun. 20, 2024

(30) Foreign Application Priority Data

Mar. 31, 2021 (JP) ................................. 2021-061674

(51) Int. Cl.

| | |
|---|---|
| ***G02B 1/18*** | (2015.01) |
| ***C09D 5/16*** | (2006.01) |
| ***C09D 183/10*** | (2006.01) |
| *G02C 7/02* | (2006.01) |

(52) U.S. Cl.
CPC ............. *G02B 1/18* (2015.01); *C09D 5/1668* (2013.01); *C09D 183/10* (2013.01); *G02C 7/02* (2013.01)

(58) Field of Classification Search
CPC ...... C09D 5/1668; C09D 183/10; C09D 5/00; C09D 143/04; C09D 151/08; C09D 175/04; C09D 175/14; G02B 1/18; G02C 7/02; G02C 7/10; G02C 11/08; G02C 7/022; G02C 2202/16; G02C 2202/20; G02C 7/00; G02C 7/041; G02C 7/043; G02C 7/044; G02C 7/048; G02C 7/049; G02C 7/06; C08F 220/20; C08F 290/061; C08F 290/068; C08F 220/283; C08F 220/56; C08F 230/085; C08F 220/54; C08G 18/4277; C08G 18/7831; C08G 18/4063; C08G 18/6229; C09K 3/18; A47L 1/15
See application file for complete search history.

(56) References Cited

U.S. PATENT DOCUMENTS

| | | | | |
|---|---|---|---|---|
| 4,478,909 A * | 10/1984 | Taniguchi | B29D 11/00865 | 428/428 |
| 5,873,931 A * | 2/1999 | Scholz | C09D 5/00 | 516/914 |
| 2009/0118428 A1* | 5/2009 | Ougitani | C09K 3/185 | 525/123 |
| 2014/0044869 A1* | 2/2014 | Phang | C09K 3/18 | 523/169 |
| 2014/0242380 A1 | 8/2014 | Ishikawa et al. | | |
| 2017/0096574 A1* | 4/2017 | Oya | C09D 7/40 | |
| 2018/0118907 A1* | 5/2018 | Sakamoto | B32B 15/085 | |
| 2019/0375676 A1* | 12/2019 | Liang | C03C 17/32 | |
| 2021/0079256 A1* | 3/2021 | Iseda | C03C 17/009 | |

FOREIGN PATENT DOCUMENTS

| | | | | |
|---|---|---|---|---|
| EP | 1875836 A2 * | 1/2008 | C08G 18/4277 |
| JP | 2009-091243 A | 4/2009 | |
| JP | 2015-140423 A | 8/2015 | |
| JP | 2019094468 A * | 6/2019 | |
| JP | 2020-152751 A | 9/2020 | |
| WO | 2013/005710 A1 | 1/2013 | |
| WO | 2019/217384 A1 | 11/2019 | |

OTHER PUBLICATIONS

Jun. 7, 2022 International Search Report issued in International Patent Application No. PCT/JP2022/016607.
Jun. 7, 2022 Written Opinion issued in International Patent Application No. PCT/JP2022/016607.
Feb. 20, 2025 Extended Search Report issued in European Patent Application No. 22781254.2.
Jun. 2, 2026 Office Action issued in Japanese Patent Application No. 2021-061674.

* cited by examiner

*Primary Examiner* — Matthew Y Lee
(74) *Attorney, Agent, or Firm* — Oliff PLC

(57) ABSTRACT

A spectacle lens including: a substrate; and a water-absorbent antifogging layer, wherein the water-absorbent antifogging layer is an outermost layer of the spectacle lens, and the water-absorbent antifogging layer contains a resin having a siloxane bonding unit.

5 Claims, No Drawings

SPECTACLE LENS

TECHNICAL FIELD

The present disclosure relates to a spectacle lens having an antifogging layer.

BACKGROUND ART

A technique for forming an antifogging layer on the surface of a lens substrate for preventing fogging (antifogging) of a spectacle lens is conventionally known.

For example, a technique for coating the surface of a lens substrate with a surfactant is known.

In addition, a technique for forming a water-absorbent resin layer and a water-repellent layer on the surface described in the lens is also known. For example, Patent Literature 1 discloses an antifogging optical article in which a water absorbing layer containing a urethane or acrylic resin having a specific polyoxyethylene chain as a main component is formed on the surface of a glass or plastic substrate, and a water-repellent layer containing at least one of an amino-modified silicone or a mercapto-modified silicone as a main component is formed on the surface of the water absorbing layer.

CITATION LIST

Patent Literature

Patent Literature 1: WO 2013/005710 A

SUMMARY OF INVENTION

Technical Problem

In a spectacle lens in which an antifogging layer containing a surfactant is formed on the surface of a lens substrate, the surfactant is easily peeled off from the lens surface when the surfactant is wiped with water. Therefore, the durability of the antifogging layer is not sufficient and antifogging performance is also not sufficient.

Further, in the antifogging layer described in Patent Literature 1, the water absorbing layer is covered with the water-repellent layer constituting the outermost surface, so that the water absorbing layer does not exhibit water absorption performance sufficiently. Moreover, in the antifogging layer described in Patent Literature 1, the water-repellent layer is easily worn by use, and the scratch resistance is not sufficient.

An object of an embodiment of the present disclosure is to provide a spectacle lens excellent in antifogging properties and scratch resistance.

Solution to Problem

The embodiment of the present disclosure relates to the following [1] to [7].

[1] A spectacle lens including: a substrate; and a water-absorbent antifogging layer, wherein the water-absorbent antifogging layer is an outermost layer of the spectacle lens, and the water-absorbent antifogging layer contains a resin having a siloxane bonding unit.

[2] The spectacle lens according to [1], wherein a film thickness of the water-absorbent antifogging layer is 6 μm or more.

[3] The spectacle lens according to [1] or [2], wherein the water-absorbent antifogging layer is directly built up on the substrate.

[4] The spectacle lens according to any one of [1] to [3], wherein the water-absorbent antifogging layer has water repellent performance.

[5] The spectacle lens according to any one of [1] to [4], wherein the water-absorbent antifogging layer is a cured film of a coating composition containing a constituent unit derived from a siloxane compound and a constituent unit derived from acrylamide.

[6] The spectacle lens according to [5], wherein a solid content concentration of the coating composition is 10.0 to 40.0 mass %.

[7] The spectacle lens according to any one of [1] to [6], wherein the water-absorbent antifogging layer is formed of a cured film of a coating composition containing the following components (A) to (C):

Component (A): a (meth)acrylic resin having a constituent unit derived from a monomer (a-1) represented by the following general formula (1), a constituent unit derived from a monomer (a-2) represented by the following general formula (2), a constituent unit derived from a hydroxyalkyl (meth)acrylate (a-3), and a constituent unit derived from a monomer (a-4) represented by the following general formula (3);

Component (B): a polyol compound (B); and

Component (C): a polyfunctional isocyanate compound (C),

[Chemical Formula 1]

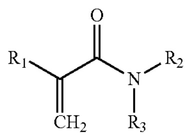

(1)

wherein $R_1$ is a hydrogen atom or a methyl group, $R_2$ and $R_3$ are each independently a hydrogen atom or an alkyl group having 1 to 3 carbon atoms, and $R_2$ and $R_3$ may be the same or different,

[Chemical Formula 2]

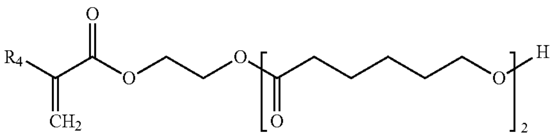

(2)

wherein $R_4$ is a hydrogen atom or a methyl group, and n is an integer of 1 to 5, and

[Chemical Formula 3]

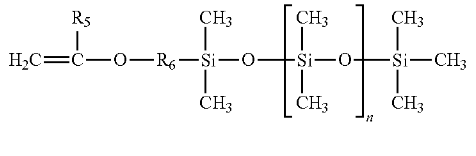

(3)

wherein $R_5$ is a hydrogen atom or a methyl group, $R_6$ is a divalent organic group, and n is 0 or an integer of 1 or more.

Advantageous Effects of Invention

According to an embodiment of the present disclosure, a spectacle lens having excellent antifogging properties can be provided.

DESCRIPTION OF EMBODIMENTS

Hereinafter, embodiments and examples of the present disclosure will be described. The same or corresponding parts are denoted by the same reference numerals, and the description thereof may not be repeated. In the embodiments and examples described below, when referring to the number, amount, and the like, the scope of the present disclosure is not necessarily limited to the number, amount, and the like unless otherwise specified. In the following embodiments, each component is not necessarily essential to the embodiments and examples of the present disclosure unless otherwise specified.

In the notation of the group (atomic group) in the present specification, the notation that does not indicate whether it is substituted or unsubstituted includes both groups having no substituent and groups having a substituent. For example, the "alkyl group" includes an alkyl group having no substituent (unsubstituted alkyl group) and an alkyl group having a substituent (substituted alkyl group).

The notation "(meth)acryl" in the present specification represents a concept including both acryl and methacryl. The same applies to similar notations such as "(meth)acrylate".

In the present specification, the constituent unit derived from the monomer (a-1) may be referred to as a "constituent unit (a-1)", the constituent unit derived from the monomer (a-2) as a "constituent unit (a-2)", the constituent unit derived from the monomer (a-3) as a "constituent unit (a-3)", and the constituent unit derived from the monomer (a-4) as a "constituent unit (a-4)".

The "solid content" in the composition means the content of components other than a solvent.

The "solid content concentration" or "solid content ratio" in the composition means the concentration or ratio of components other than the solvent in the composition.

The "carbon number" for a group having a substituent means the number of carbon atoms in a portion excluding the substituent.

Spectacle Lens

A spectacle lens according to an embodiment of the present disclosure is a spectacle lens including a substrate and a water-absorbent antifogging layer, wherein the water-absorbent antifogging layer is an outermost layer of the spectacle lens, and the water-absorbent antifogging layer contains a resin having a siloxane bonding unit.

In the spectacle lens according to an embodiment of the present disclosure, the water-absorbent antifogging layer is the outermost layer of the spectacle lens and the water-absorbent antifogging layer is not covered with the water-repellent layer. Therefore, the water-absorbent antifogging layer sufficiently exhibits water absorption performance, and as a result, the spectacle lens is excellent in antifogging properties. In addition, the spectacle lens according to an embodiment of the present disclosure contains a resin having a siloxane bonding unit. Therefore, the slipperiness of the antifogging water absorbing layer is improved, and as a result, the spectacle lens is excellent in scratch resistance.

In the present disclosure, the "water-absorbent antifogging layer" means a layer containing a resin having a siloxane bonding unit.

In the present disclosure, the water-absorbent antifogging layer may be simply referred to as an antifogging layer.

Substrate

As the substrate, a resin made of various types of raw materials can be used.

Examples of the resin constituting the substrate include a polycarbonate resin, a urethane urea resin, a (thio) urethane resin, a polysulfide resin, a polyamide resin, a polyester resin, an acrylic allyl resin, and an allyl carbonate resin. The (thio) urethane resin means at least one selected from a thiourethane resin and a urethane resin. Among them, a (thio) urethane resin and a polysulfide resin are preferable.

In addition, the substrate used for the spectacle lens of the present embodiment is preferably a plastic substrate having a refractive index of 1.50 or more, and more preferably a plastic substrate having a refractive index of 1.60 or more.

Preferable commercially available products of the plastic substrate include an allyl carbonate-based plastic lens "HILUX 1.50" (manufactured by HOYA Corporation, refractive index 1.50), a thiourethane-based plastic lens "MERIA" (manufactured by HOYA Corporation, refractive index 1.60), a thiourethane-based plastic lens "EYAS" (manufactured by HOYA Corporation, refractive index 1.60), a thiourethane-based plastic lens "EYNOA" (manufactured by HOYA Corporation, refractive index 1.67), a polysulfide-based plastic lens "EYRY" (manufactured by HOYA Corporation, refractive index 1.70), and a polysulfide-based plastic lens "EYVIA" (manufactured by HOYA Corporation, refractive index 1.74).

The thickness and the outer diameter of the substrate are not particularly limited, but the thickness is usually about 0.5 to 30 mm, for example, 1 to 30 mm, and the outer diameter is usually about 50 to 100 mm.

The substrate may be either a finish lens or a semi-finish lens.

The surface shape of the substrate is not particularly limited, and may be any of a flat surface, a convex surface, a concave surface, or the like.

The spectacle lens of the present disclosure may be any of a single focal lens, a multifocal lens, a progressive addition lens, or the like. In a progressive addition lens, usually, a near vision region (near portion) and a progressive region (intermediate region) are included in a lower region described above, a distance vision region (distance portion) is included in an upper region.

Antifogging Layer

The antifogging layer is a layer having water absorbency from the viewpoint of obtaining a spectacle lens excellent in antifogging properties. Here, the water absorbency indicates a property that the material takes moisture therein. The presence or absence of the water absorbency of a spectacle lens having an antifogging layer can also be determined by whether or not the time required from exposure to a wet atmosphere to the start of fogging is longer than that of a spectacle lens having no antifogging layer.

The antifogging layer is provided as the outermost layer of the spectacle lens from the viewpoint of sufficiently exhibiting antifogging properties.

The antifogging layer may be provided only on any one of the main surfaces of the substrate, or may be provided on both surfaces of the substrate.

As one aspect according to the present embodiment, the antifogging layer is preferably provided directly on the substrate from the viewpoint of the antifogging durability. That is, the spectacle lens according to the present embodiment preferably has the antifogging layer directly on the substrate.

The thickness of the antifogging layer is preferably 1 to 100 μm, more preferably 3 to 60 μm, still more preferably 6 to 50 μm, still even more preferably 8 to 40 μm, still even more preferably 8 to 40 μm, and still even more preferably 12 to 30 μm from the viewpoint of ease of production.

The thickness of the antifogging layer is preferably 1 μm or more, more preferably 3 μm or more, still more preferably 6 μm or more, still even more preferably 8 μm or more, and still even more preferably 12 μm or more from the viewpoint of improving antifogging properties, and is preferably 100 μm or less, more preferably 60 μm or less, still more preferably 50 μm or less, still even more preferably 40 μm or less, and still more even preferably 30 μm or less from the viewpoint of ease of production.

The antifogging layer preferably has water repellent performance. Accordingly, the antifogging performance is further improved.

Coating Composition

The antifogging layer is preferably a cured film of a coating composition containing a constituent unit derived from a siloxane compound and a constituent unit derived from acrylamide.

When the antifogging layer has a constituent unit derived from a siloxane compound, the slipperiness of the antifogging layer is improved, and as a result, the scratch resistance of the antifogging layer is improved. In addition, when the antifogging layer has an amide group derived from acrylamide, the hydrophilicity of the antifogging layer is increased. This improves water absorption performance, and as a result, improves antifogging properties.

The solid content concentration of the coating composition is preferably 10.0 to 40.0 mass %. When the solid content concentration is 10.0 mass % or more, the film thickness of the antifogging layer can be increased. When the solid content concentration is 40.0 mass % or less, an antifogging layer having a uniform film thickness can be obtained. From this viewpoint, the solid content concentration of the coating composition is more preferably 12.0 to 30.0 mass %, still more preferably 15.0 to 30.0 mass %, and still even more preferably 16.5 to 24.5 mass %.

The antifogging layer is preferably formed of a cured film of a coating composition containing the following components (A) to (C):

Component (A): a (meth)acrylic resin having a constituent unit derived from a monomer (a-1) represented by the following general formula (1), a constituent unit derived from a monomer (a-2) represented by the following general formula (2), a constituent unit derived from a hydroxyalkyl (meth)acrylate (a-3), and a constituent unit derived from a monomer (a-4) represented by the following general formula (3);

Component (B): a polyol compound (B); and

Component (C): a polyfunctional isocyanate compound (C),

[Chemical Formula 4]

(1)

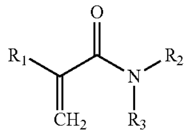

wherein $R_1$ is a hydrogen atom or a methyl group, and $R_2$ and $R_3$ are each independently a hydrogen atom or a linear or branched alkyl group having 1 to 3 carbon atoms,

[Chemical Formula 5]

(2)

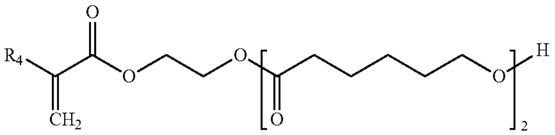

wherein $R_4$ is a hydrogen atom or a methyl group, and n is an integer of 1 to 5, and

[Chemical Formula 6]

(3)

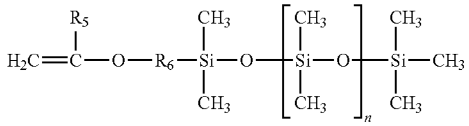

wherein $R_5$ is a hydrogen atom or a methyl group, $R_6$ is a divalent organic group, and n is 0 or an integer of 1 or more.

The constituent unit (a-1) contained in the component (A) (also referred to as a (meth)acrylic resin) has an amide group, is highly hydrophilic, and easily retains moisture therein. It is therefore considered that moisture adhering to the surface of the antifogging layer obtained by curing the coating composition is easily absorbed into the cured film. In addition, it is considered that by blending the polyol compound (B), a gap for sufficiently absorbing moisture can be present while maintaining the crosslinking density required as the antifogging layer. For these reasons, it is considered that antifogging properties are imparted.

The constituent unit (a-2) contained in the component (A) is a constituent unit having a polycaprolactone structure, and contributes to improvement in flexibility and elasticity of the antifogging layer due to its flexible chemical skeleton. In addition, by containing the constituent unit (a-3) which is more rigid than the constituent unit (a-2), a balance between flexibility and elasticity is secured. On the other hand, the polydimethylsiloxane chain of the constituent unit (a-4) contributes to improvement in slipperiness with respect to the antifogging layer. Therefore, when an external force is applied to the antifogging layer, the above-described two effects of absorbing the external force by the flexibility and elasticity of the antifogging layer and releasing the external force to the outside of the antifogging layer by the slipperiness are synergistically exhibited. As a result, it is considered that the antifogging layer is less likely to be scratched.

In the coating composition, preferably, the proportion of the constituent unit derived from the monomer (a-1) is 20 mass % or more and 65 mass % or less, the proportion of the constituent unit derived from the monomer (a-2) is 10 mass % or more and 40 mass % or less, and the proportion of the constituent unit derived from the monomer (a-4) is 1 mass % or more and 10 mass % or less, with respect to 100 mass % of all the constituent units constituting the component (A). In the coating composition, the ratio (NCO)/(OH) of the number (NCO) of isocyanate groups contained in the component (C) to the total amount (OH) obtained by adding the number of hydroxyl groups contained in the component (A) and the number of hydroxyl groups contained in the component (B) is preferably 0.15 or more and 0.55 or less.

It is considered that when the composition of the coating composition is as described above, the equivalent ratio (NCO/OH) is set to a specific range smaller than 1 while maintaining the balance (amount ratio) between the constituent unit (a-2) and the constituent unit (a-3) having a hydroxyl group in the component (A), so that the hardness of the antifogging layer can be increased to an extent that the friction resistance is improved. In addition, it is considered that the equivalent ratio (NCO/OH) is set to a specific range smaller than 1 while maintaining the structural balance between the constituent unit (a-2) and the constituent unit (a-3) having a hydroxyl group in the component (A), so that the crosslinking density of the antifogging layer is increased, and the solvent resistance of the antifogging layer is improved.

The components contained in the coating composition of the present embodiment will be described below.

Component (A): (Meth)Acrylic Resin

The coating composition of the present embodiment preferably contains a (meth)acrylic resin as the component (A), that is, a (meth)acrylic resin having a constituent unit derived from a monomer (a-1) represented by the following general formula (1), a constituent unit derived from a monomer (a-2) represented by the following general formula (2), a constituent unit derived from a hydroxyalkyl (meth) acrylate (a-3), and a constituent unit derived from a monomer (a-4) represented by the following general formula (3).

As described above, it is considered that the constituent unit (a-1) is mainly involved in the absorption of water (moisture).

The (meth)acrylic resin can be typically obtained by polymerizing the monomer (a-1), the monomer (a-2), the monomer (a-3), and the monomer (a-4). Details of the polymerization method will be described later.

In the present embodiment, 100% of the constituent units constituting the (meth)acrylic resin need not be a constituent unit derived from a (meth)acrylic monomer. That is, the (meth)acrylic resin may partially (but not entirely) contain a constituent unit derived from a monomer other than a (meth)acrylic monomer.

In order to obtain the effect derived from the (meth)acrylic structure sufficiently, 50 mass % or more of all the constituent units of the (meth)acrylic resin is preferably a constituent unit derived from a (meth)acrylic monomer. More preferably, 80 mass % or more of all the constituent units of the (meth)acrylic resin is a constituent unit derived from a (meth)acrylic monomer. Still more preferably, all (100%) constituent units of the (meth)acrylic resin are a constituent unit derived from a (meth)acrylic monomer.

The monomer (a-1) is not particularly limited as long as the monomer has the structure of the general formula (1) described above. Specific examples thereof include (meth) acrylamide, N-methylacrylamide, N, N-dimethyl (meth) acrylamide, N-ethyl (meth)acrylamide, N, N-diethyl (meth) acrylamide, N-n-propyl (meth)acrylamide, and N-isopropyl (meth)acrylamide.

At least one kind of the monomer (a-1) may be used, and two or more kinds thereof may be used in combination. For example, a (meth)acrylic resin may be obtained by performing a polymerization reaction using two or more kinds of the monomers listed above.

The monomer (a-1) particularly preferably contains N,N-dimethyl (meth)acrylamide or N,N-diethyl (meth)acrylamide from the viewpoint of improving antifogging performance.

In the present embodiment, the content of the constituent unit derived from the monomer (a-1) in the (meth)acrylic resin is preferably 20 to 65 mass % with respect to the total amount of all the constituent units of the resin. The content is more preferably 35 to 60 mass %, and still more preferably 40 to 55 mass %. When the content of the constituent unit derived from the monomer (a-1) is 20 mass % or more, an antifogging layer exhibiting antifogging performance suitable for practical use is easily formed. When the content of the constituent unit derived from the monomer (a-1) is 65 mass % or less, the ratio of constituent units derived from other monomers is prevented from being relatively decreased, making it easy to maintain the balance of the entire composition.

The monomer (a-2) is not particularly limited as long as the monomer has the structure of the general formula (2).

In the present embodiment, the (meth)acrylic resin contains the constituent unit derived from the monomer (a-2) in an amount of preferably 10 to 40 mass %, more preferably 20 to 38 mass %, and still more preferably 25 to 35 mass % with respect to the total amount of all the constituent units of the resin.

When the content of the constituent unit derived from the monomer (a-2) is 10 mass % or more, the flexibility of the antifogging layer is easily secured, and when the content is 40 mass % or less, the elasticity of the antifogging layer is easily secured.

The (meth)acrylic resin may contain a plurality of types of repeating units derived from the monomer (a-2).

The monomer (a-3) is a hydroxyalkyl (meth)acrylate. Specific examples of the hydroxyalkyl (meth)acrylate include hydroxyethyl (meth)acrylate, hydroxypropyl (meth) acrylate, and hydroxybutyl (meth)acrylate. In the present embodiment, among these, hydroxyethyl (meth)acrylate is preferable.

In the present embodiment, the content of the constituent unit derived from the monomer (a-3) in the (meth)acrylic resin is preferably 1 to 30 mass %, more preferably 2 to 20 mass %, and still more preferably 3 to 15 mass % with respect to the total amount of all the constituent units of the (meth)acrylic resin.

The monomer (a-3) has a hydroxyl group as with the monomer (a-2), and undergoes a crosslinking reaction with a polyfunctional isocyanate compound described later to form the antifogging layer.

In the present embodiment, the monomer (a-2) is subjected to a crosslinking reaction with a polyfunctional isocyanate compound together with the monomer (a-3) instead of subjecting only the monomer (a-2) to a crosslinking reaction to form the antifogging layer, thereby yielding an antifogging layer having various physical properties.

As described above, since the (meth)acrylic resin contains the constituent unit derived from the monomer (a-2) and the constituent unit derived from the monomer (a-3), the (meth) acrylic resin has a hydroxyl group as a whole, that is, has a hydroxyl value. Therefore, the (meth)acrylic resin can form a crosslinked structure by being reacted with a polyfunctional isocyanate compound described later together with a polyol compound described later.

The hydroxyl value of the (meth)acrylic resin is preferably 40 to 150 mgKOH/g, more preferably 70 to 140 mgKOH/g, and still more preferably 90 to 130 mgKOH/g.

Within this numerical range, the (meth)acrylic resin reacts with a polyfunctional isocyanate compound (described later) together with a polyol compound (described later), so that the crosslinked structure is easily controlled appropriately. Therefore, the antifogging layer can be hardened while maintaining the flexibility and elasticity of the antifogging layer. Therefore, it is easy to achieve a higher level of compatibility between the scratch resistance, reduction in friction resistance, and solvent resistance of the antifogging layer.

The hydroxyl value means the number of mg of potassium hydroxide required to neutralize acetic acid bonded to a hydroxyl group when 1 g of a sample is acetylated.

The monomer (a-4) is not particularly limited as long as the monomer has the structure of the general formula (3).

The (meth)acrylic resin may contain a plurality of types of repeating units derived from the monomer (a-4). For example, a (meth)acrylic resin may be obtained by performing a polymerization reaction using two or more kinds of the monomers listed above.

In the present embodiment, the content of the constituent unit derived from the monomer (a-4) in the (meth)acrylic resin is preferably 1 to 10 mass %, more preferably 2 to 8 mass %, and still more preferably 3 to 7 mass % with respect to the total amount of all the constituent units of the resin.

When the content of the constituent unit derived from the monomer (a-4) is 1 mass % or more, an antifogging layer that satisfies scratch resistance is easily obtained. When the content is 10 mass % or less, a homogeneous (meth)acrylic resin is easily synthesized.

The (meth)acrylic resin may or may not include any constituent unit (constituent unit (a-5)) other than the constituent unit (a-1), the constituent unit (a-2), the constituent unit (a-3), and the constituent unit (a-4). Examples of the constituent unit (a-5) include constituent units derived from monomers represented below. By including such a constituent unit in the (meth)acrylic resin, the glass transition temperature of the (meth)acrylic resin and the physical properties (hardness, softness, and the like of the antifogging layer) of the antifogging layer can be adjusted and optimized.

Examples of the constituent unit (a-5) include constituent units derived from a monomer represented by the general formula $CH_2{=}CR{-}COO{-}R'$ where R is a hydrogen atom or a methyl group, and R' is an alkyl group, a monocyclic or polycyclic cycloalkyl group, an aryl group, or an aralkyl group.

Specific examples of the monomer include methyl (meth) acrylate, ethyl (meth)acrylate, n-butyl (meth)acrylate, isobutyl (meth)acrylate, tert-butyl (meth)acrylate, 2-ethylhexyl (meth)acrylate, isodecyl (meth)acrylate, n-lauryl (meth)acrylate, n-stearyl (meth)acrylate, phenyl (meth)acrylate, and benzyl (meth)acrylate.

Among them, a monomer in which R' is an alkyl group having 1 to 8 carbon atoms is preferable, a monomer in which R' is an alkyl group having 1 to 6 carbon atoms is more preferable, and a monomer in which R' is an alkyl group having 1 to 4 carbon atoms is still more preferable.

The (meth)acrylic resin may include a plurality of types of repeating units corresponding to the constituent unit (a-5). For example, a (meth)acrylic resin may be obtained by performing a polymerization reaction using two or more kinds of the monomers listed above as specific examples.

When the (meth)acrylic resin contains the constituent unit (a-5), the content thereof is preferably 1 to 40 mass %, more preferably 3 to 30 mass %, and still more preferably 5 to 20 mass % with respect to the total amount of all the constituent units of the (meth)acrylic resin.

The mass average molecular weight (Mw) of the (meth) acrylic resin is not particularly limited, but is preferably 10,000 to 100,000, more preferably 20,000 to 70,000, and still more preferably 30,000 to 60,000. When the mass average molecular weight is 10,000 or more, it is easy to obtain desired antifogging performance, and when the mass average molecular weight is 100,000 or less, the coating composition tends to be excellent in application suitability when applied to an object to be coated such as a spectacle lens.

The mass average molecular weight can be determined by gel permeation chromatography (GPC) using polystyrene as a standard substance.

The glass transition temperature of the (meth)acrylic resin is not particularly limited, but is preferably 20 to 120° C., more preferably 30 to 110° C., and still more preferably 35 to 100° C.

The glass transition temperature of the (meth)acrylic resin can be determined by various methods, and can be determined, for example, based on the following Fox's equation.

$$1/Tg=(W_1/Tg_1)+(W_2/Tg_2)+(W_3/Tg_3)+ \ldots +(W_n/Tg_n)$$

wherein Tg represents the glass transition temperature (K) of the (meth)acrylic resin, $W_1$, $W_2$, $W_3$ . . . $W_n$ each represent the mass fraction of each monomer, $Tg_1$, $Tg_2$, $Tg_3$ . . . $Tg_n$ each represent the glass transition temperature (K) of a homopolymer composed of a monomer corresponding to the mass fraction of each monomer.

In the present specification, the glass transition temperature of the (meth)acrylic resin (not the glass transition temperature of the antifogging layer, but the glass transition temperature of the (meth)acrylic resin alone) means a glass transition temperature determined based on the above equation. Note that the glass transition temperature of a monomer whose glass transition temperature is unknown, such as special monomers or polyfunctional monomers is determined using only a monomer whose glass transition temperature is known.

The (meth)acrylic resin can be typically obtained by a polymerization reaction. The polymerization reaction may be performed by various methods such as radical polymerization, cationic polymerization, and anionic polymerization, and among them, radical polymerization is preferable. The polymerization may be any of solution polymerization, suspension polymerization, emulsion polymerization, and the like. Among them, solution polymerization is preferable from the viewpoint of precise control of polymerization and the like.

As the polymerization initiator for radical polymerization, a known polymerization initiator can be used. Examples of the polymerization initiator include azo-based initiators such as 1,1'-azobis(cyclohexane-1-carbonitrile), azobisisobutyronitrile, 2,2-azobis(2-methylbutyronitrile), 2,2-azobis(2-methylpropionitrile), and 2,2-azobis(2,4-dimethylvaleronitrile); peroxide-based initiators such as benzoyl peroxide, t-butyl peroxyoctanoate, diisobutyl peroxide, di(2-ethylhexyl) peroxypivalate, decanoyl peroxide, t-butyl peroxy-2-ethylhexanoate, and t-butyl peroxybenzoate; and redox-based initiators combining an oxidizing agent and a reducing agent, such as hydrogen peroxide and an iron(II) salt, and a persulfate and sodium bisulfite. These may be used singly or in combination of two or more kinds thereof.

The blending amount of the polymerization initiator is not particularly limited, but is preferably 0.001 to 10 parts by mass based on 100 parts by mass of the total amount of the mixed liquid of monomers to be polymerized.

In the polymerization reaction, a known chain transfer agent, a polymerization inhibitor, a molecular weight modifier, or the like may be appropriately used. Further, the polymerization reaction may be performed in one stage or in two or more stages. The temperature of the polymerization reaction is not particularly limited, but is typically in a range of 50° C. to 200° C., preferably 80° C. to 150° C.

Component (B): Polyol Compound

The coating composition of the present embodiment preferably contains a polyol compound. When the antifogging layer coating composition contains the polyol compound, the polyol compound reacts with the polyfunctional isocyanate compound described later together with the (meth) acrylic resin, making it possible to form an antifogging layer having more excellent antifogging durability. The number of hydroxyl groups of the polyol compound in one molecule is 2 or more, preferably 2 to 6, and more preferably 2 to 4.

The polyol compound preferably contains at least one or more polyol compounds selected from the group consisting of a polycaprolactone polyol, a polycarbonate polyol, and a polyether polyol. The chemical structures of these polyol compounds are moderately flexible and elastic. Therefore, such polyol compounds can further improve the flexibility and elasticity of the cured film.

The polycaprolactone polyol can be used without particular limitation as long as it is a compound having a ring-opened structure of caprolactone and two or more hydroxyl groups in one molecule.

The polycarbonate polyol can be used without particular limitation as long as it is a compound having a carbonate group represented by —O—(C═O)—O— and two or more hydroxyl groups in one molecule. The polycarbonate polyol can be obtained by reacting one or more kinds of polyol raw materials (polyhydric alcohols) with a carbonate ester or phosgene.

The polyol raw material is not particularly limited, and examples thereof include aliphatic polyols, polyols having an alicyclic structure, and aromatic polyols. In the present embodiment, an aliphatic polyol having no alicyclic structure is preferable from the viewpoint of the flexibility of the cured film.

Examples of the carbonate ester include aliphatic carbonate esters such as dimethyl carbonate and diethyl carbonate; aromatic carbonate esters such as diphenyl carbonate; and cyclic carbonate esters such as ethylene carbonate. Among them, an aliphatic carbonate ester is preferable, and dimethyl carbonate is particularly preferable from the viewpoint of availability and ease of production.

The polyether polyol can be used without particular limitation as long as it is a compound having an ether bond (—O—) and two or more hydroxyl groups in one molecule.

Specific examples of the compound include polyether polyols obtained by addition polymerization of an alkylene oxide such as ethylene oxide, propylene oxide, or butylene oxide, using, as an initiator, a compound having two or more, preferably two or three active hydrogen groups such as a low molecular weight polyol such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylolheptane, diethylene glycol, dipropylene glycol, neopentyl glycol, cyclohexane-1,4-diol, cyclohexane-1,4-dimethanol, dimer acid diol, bisphenol A, bis(β-hydroxyethyl)benzene, xylylene glycol, glycerin, trimethylolpropane, and pentaerythritol; or a low molecular weight polyamine such as ethylenediamine, propylenediamine, toluenediamine, meta-phenylenediamine, diphenylmethanediamine, and xylylenediamine; and polyether polyols obtained by ring-opening polymerization of a cyclic ether monomer including an alkyl glycidyl ether such as methyl glycidyl ether, an aryl glycidyl ether such as phenyl glycidyl ether, and tetrahydrofuran.

In the present embodiment, the polyol compound may be a compound corresponding to a plurality of polycaprolactone polyols, polycarbonate polyols, and polyether polyols. The polyol compound may be, for example, a polyether polyester polyol having an ether bond and an ester bond.

The polyol compound may also contain a plurality of types of polycaprolactone polyols, polycarbonate polyols, and polyether polyols.

The hydroxyl value of the polyol compound is preferably 50 to 500 mgKOH/g, more preferably 100 to 350 mgKOH/g, and still more preferably 150 to 250 mgKOH/g. By setting the amount of the hydroxyl group to an appropriate amount, the crosslinked structure formed by the reaction with the polyfunctional isocyanate compound described below is controlled, thus making it easy to improve the flexibility, elasticity, and the like of the cured film.

In the present embodiment, the mass average molecular weight (Mw) of the polyol compound is preferably 450 to 2,500, more preferably 500 to 1,500, and still more preferably 500 to 700. By setting the molecular weight to an appropriate value, it is possible to more easily achieve both suppression of the change in appearance of the cured film due to improvement in flexibility and elasticity and durability of the cured film such as gasoline resistance, at a higher level.

The content of the polyol compound in the coating composition is preferably 5 to 200 parts by mass, more preferably 15 to 180 parts by mass, still more preferably 20 to 150 parts by mass, still even more preferably 20 to 100 parts by mass, still even more preferably 20 to 50 parts by mass, and still even more preferably 20 to 40 parts by mass with respect to 100 parts by mass of the (meth)acrylic resin. Within this numerical range, the performance derived from the polyol compound is easily obtained, and the balance with other components is easily achieved.

In the present embodiment, the polyol compound preferably contains a polycaprolactone polyol among the polycaprolactone polyol, the polycarbonate polyol, and the polyether polyol described above, and particularly preferably contains a polycaprolactone diol (a compound having a caprolactone structure and two hydroxyl groups) among polycaprolactone polyols.

This is because there is a tendency that the polycaprolactone diol as the polyol compound tends to have good compatibility with the (meth)acrylic resin as the component (A), which has the structure of the general formula (2) described above, that is, the caprolactone structure, and also tends to improve antifogging performance without excessively increasing the crosslinking density.

Component (C): Polyfunctional Isocyanate Compound

The coating composition of the present embodiment preferably contains a polyfunctional isocyanate compound as the component (C). When the coating composition contains the polyfunctional isocyanate compound, the hydroxyl groups of the constituent unit (a-2) and the constituent unit (a-3) contained in the (meth)acrylic resin as the component (A) and the hydroxyl group of the polyol compound as the component (B), and the polyfunctional isocyanate compound cause a crosslinking reaction, so that an antifogging layer having excellent antifogging durability is obtained.

The polyfunctional isocyanate compound is a compound having two or more isocyanate groups (including isocyanate groups protected by a leaving group) in one molecule. Preferably, the number of functional groups of the polyfunctional isocyanate compound is more preferably 2 to 6 per molecule, and still more preferably 2 to 4 per molecule.

Examples of the polyfunctional isocyanate compound include aliphatic diisocyanates such as lysine isocyanate, hexamethylene diisocyanate, and trimethylhexane diisocyanate; cyclic aliphatic diisocyanates such as hydrogenated xylylene diisocyanate, isophorone diisocyanate, methylcyclohexane-2,4-(or 2,6)-diisocyanate, 4,4'-methylenebis(cyclohexyl isocyanate), and 1,3-(isocyanatomethyl)cyclohexane; and tri- or higher functional isocyanates such as lysine triisocyanate.

As the polyfunctional isocyanate compound as the component (C), in addition to those described above, a multimer thereof such as a biuret type, an isocyanurate type, or an adduct type may be used. Among them, a biuret type polyfunctional isocyanate compound having moderate rigidity is preferable.

In the present embodiment, the content of the polyfunctional isocyanate compound in the coating composition is not particularly limited as long as it is blended according to the equivalent ratio (NCO)/(OH) described later. The content is usually 5 to 100 parts by mass, preferably 7 to 75 parts by mass, more preferably 10 to 60 parts by mass, still more preferably 10 to 50 parts by mass, still even more preferably 15 to 40 parts by mass, and still even more preferably 20 to 30 parts by mass with respect to 100 parts by mass of the (meth)acrylic resin. Within this numerical range, it is considered that necessary and sufficient crosslinking is performed in the cured film.

The molar amount (that is, equivalent ratio (NCO)/(OH)) of the isocyanate groups (including a blocked isocyanate group) contained in the polyfunctional isocyanate compound to the hydroxyl groups contained in the (meth)acrylic resin and the polyol compound is preferably in a range of 0.15 to 0.55. When the equivalent ratio (NCO)/(OH) is within this range, the crosslinking density becomes sufficiently high, and as a result, functions such as antifogging properties and solvent resistance as a cured film become sufficient.

From this viewpoint, the equivalent ratio (NCO)/(OH) is preferably 0.25 to 0.50 and more preferably 0.35 to 0.45.

Form of Coating Composition

The coating composition of the present embodiment may be a one-component type, that is, a state in which all components other than a solvent are substantially uniformly mixed (dissolved or dispersed) in the solvent. When the polyfunctional isocyanate compound is a blocked isocyanate, the one-component type is preferable.

As another aspect, the coating composition of the present embodiment may be a two-component type. By preparing the coating composition as a two-component type, the storage stability of the coating composition can be improved.

For example, the coating composition of the present embodiment may be composed of (1) a liquid A containing a (meth)acrylic resin and/or a polyol compound but not containing a polyfunctional isocyanate compound, and (2) a liquid B containing a polyfunctional isocyanate compound but not containing a (meth)acrylic resin and a polyol compound. The liquid A and the liquid B may be stored in separate containers, and the liquid A and the liquid B may be mixed immediately before use (application).

In this case, components (additives and the like) other than the (meth)acrylic resin, the polyol compound, and the polyfunctional isocyanate compound may be contained in the liquid A, contained in the liquid B, or prepared in another container.

In particular, when the polyfunctional isocyanate compound is not a blocked isocyanate (that is, when the isocyanate group is present in the form of —NCO in the system), the coating composition is preferably a two-component type.

Solvent

The coating composition of the present embodiment may also contain a solvent. The use of the solvent makes it easy to adjust the viscosity and the solid content of the coating composition.

Examples of the solvent include aromatic hydrocarbon solvents such as toluene and xylene; alcohol solvents such as methanol, ethanol, isopropyl alcohol, n-butanol, t-butanol, isobutanol, and diacetone alcohol; ketone solvents such as acetone, methyl ethyl ketone, methyl isobutyl ketone, and cyclohexanone; ester solvents such as ethyl acetate, propyl acetate, butyl acetate, and isobutyl acetate; and glycol ether solvents such as propylene glycol monomethyl acetate, propylene glycol monomethyl ether, and propylene glycol monomethyl ether acetate.

Among them, t-butanol, diacetone alcohol, methyl ethyl ketone, ethyl acetate, and propylene glycol monomethyl ether acetate are preferable from the viewpoint of low reactivity with isocyanate, solubility, drying property, and the like.

The content of the solvent in the coating composition is preferably 20 to 90 mass %, more preferably 30 to 85 mass %, and still more preferably 35 to 80 mass % from the viewpoint of controlling the film thickness of the antifogging layer.

The total content of the components (A), (B) and (C) in the solid content of the coating composition is preferably 60 mass % or more, more preferably 80 mass % or more, still more preferably 90 mass % or more, still even more preferably 95 mass % or more, and preferably 100 mass % or less, for example, 100 mass % from the viewpoint of improving antifogging properties and scratch resistance.

Other Additives

The coating composition may contain additives such as a curing catalyst, an ultraviolet absorber, a light stabilizer, a surfactant, a leveling agent, and an antifoaming agent as necessary.

The content of the additive is, for example, preferably 0.001 to 5 mass %, more preferably 0.01 to 4 mass %, and still more preferably 0.1 to 3 mass % with respect to the total mass of the coating composition.

The coating composition can be prepared by dissolving or dispersing each component used as necessary in a solvent.

Each component can be dissolved or dispersed in the solvent simultaneously or sequentially in any order. A specific dissolution or dispersion method is not particularly limited, and a known method can be adopted without any limitation.

Other Layers

The spectacle lens may be provided with a functional layer other than the antifogging layer.

Examples of the functional layer include a hard coat layer, an antireflection layer, and a primer layer.

The functional layer may be provided on a first main surface of the lens substrate, may be provided on a second main surface of the lens substrate, or may be provided on both the first main surface and the second main surface of the lens substrate. In addition, the antifogging layer may be provided on the functional layer after providing the functional layer on the lens substrate, or the functional layer may be provided after providing the antifogging layer on the lens substrate.

Method for Producing Spectacle Lens

The method for producing a spectacle lens according to the present embodiment includes a step 1 of forming an antifogging layer.

In one aspect, first, a composition for an antifogging layer is prepared by dissolving or dispersing each component used as necessary in a solvent.

Subsequently, an antifogging layer is formed using the obtained coating composition 1 (step 1). In the step 1, it is preferable to apply the coating composition onto the substrate or another layer formed on the substrate, and subsequently perform pre-curing at preferably 70 to 120° C., more preferably 75 to 110° C., and still more preferably 80 to 100° C., for preferably 10 to 60 minutes, more preferably 15 to 50 minutes, and still more preferably 20 to 40 minutes.

The step 1 may be performed once or twice or more. By performing the step 1 twice or more, it is easy to increase the thickness of the antifogging layer.

The application method for the antifogging layer is not particularly limited, and examples thereof include an air spray method, an airless spray method, an electrostatic coating method, a roll coater method, a flow coater method, a spin coating method, and a dipping method. A dipping method is preferable from the viewpoint of productivity.

When the dipping method is employed as the application method, usually, the film thickness of the portion previously pulled up from the dipping tank (coating composition tank) becomes thin, and the film thickness of the portion pulled up from the dipping tank last becomes thick. Therefore, when a coating composition 2 is applied, it is preferable to perform dipping by rotating the substrate in the vertical direction of the substrate by 180 degrees with respect to the direction of the substrate when the coating composition 1 is applied. This makes it easy to obtain a spectacle lens including an antifogging layer having a uniform film thickness.

After the antifogging layer is formed, it is preferable to perform drying and curing at 20 to 160° C. for 10 to 140 minutes, and preferably at 60 to 130° C. for 20 to 150 minutes. The temperature and time for drying and curing may be appropriately adjusted in consideration of the type of solvent, the heat resistance of the lens substrate, and the like.

Incidentally, after the functional layer (hard coat layer, primer layer, antireflection layer, and the like) described above is provided on the lens substrate, the antifogging layer may be provided as necessary on the functional layer, or after the antifogging layer is provided on the lens substrate, the functional layer may be provided as necessary on the antifogging layer.

In the present invention, as for the examples of components, contents, and physical properties, matters exemplified or described as a preferable range in the detailed description of the invention may be combined with each other arbitrarily.

In addition, by adjusting the composition described in Examples so as to be the composition described in the detailed description of the invention, the invention can be performed in a similar manner to Examples in the entire claimed composition range.

In the present invention, as for the examples of components, contents, and physical properties, matters exemplified or described as a preferable range in the detailed description of the invention may be combined with each other arbitrarily.

In addition, by adjusting the composition described in Examples so as to be the composition described in the detailed description of the invention, the invention can be performed in a similar manner to Examples in the entire claimed composition range.

EXAMPLES

Next, the present invention will be described in more detail by way of Examples, but the present invention is not limited in any way by these Examples.

Measurement and Evaluation

The following items were measured and evaluated for the coating compositions and spectacle lenses obtained in Examples and Comparative Example below. The measurement and evaluation results are shown in Table 1.

Hydroxyl Value

The hydroxyl value was measured and calculated according to the method specified in "7.1 Neutralization titration method" of JIS K 0070: 1992 "Test methods for acid value, saponification value, ester value, iodine value, hydroxyl value and unsaponifiable matter of chemical products".

The value of the acid value used for calculating the hydroxyl value was measured and calculated according to the method specified in "3.1 Neutralization titration method" of the JIS standard described above.

Number Average Molecular Weight (Mn), Mass Average Molecular Weight (Mw), Polydispersity Index (Mw/Mn)

The number average molecular weight, mass average molecular weight, and polydispersity index were measured and calculated by gel permeation chromatography (GPC). The apparatus, conditions, and the like used are as follows.

Equipment used: HLC-8220GPC (manufactured by Tosoh Corporation)
Column used: TSKgel SuperHZM-M, TSKgel GMHXL-H, TSKgel G2500HXL, TSKgel G5000HXL (manufactured by Tosoh Corporation)
Column temperature: 40° C.
Standard substance: TSKgel standard polystyrene A1000, A2500, A5000, F1, F2, F4, F10 (manufactured by Tosoh Corporation)
Detector: RI (refractive index) detector
Eluent: tetrahydrofuran
Flow rate: 1 ml/min

Measurement of Film Thickness of Antifogging Layer

The film thickness of the antifogging layer of the obtained spectacle lens was measured using a non-contact film thickness measurement system FF8 manufactured by System-Road Co., Ltd.

Evaluation of Antifogging Properties

As an apparatus for evaluating antifogging properties, "AFA-2" manufactured by Kyowa Interface Science Co., Ltd. was used. The obtained spectacle lens was placed in a sample chamber with the surface on which the antifogging layer had been formed facing upward. The atmosphere in the sample chamber was held in the initial state (temperature: 24° C., humidity: 20%) for 10 minutes. Next, the setting conditions of the atmosphere were switched so that the atmosphere was in the measurement state (temperature: 5° C., humidity: 70%). The antifogging layer was photographed every 30 seconds from the start of the switching, and the compression antifogging index was obtained. The time required from the start of the switching to the start of the decrease in the compression antifogging index was defined as a fogging start time.

Evaluation of Scratch Resistance

An abrasion test was performed under the following conditions, and the state after the abrasion test was visually evaluated.

Apparatus name: reciprocating abrasion tester TRIBOGEAR 30S (manufactured by Shinto Scientific Co., Ltd.)
Abrasion material: lens cleaning paper Dusper K3 (manufactured by Ozu Corporation)
Support: eraser (the half portion thereof includes an ink eraser) (manufactured by Lion Office Products Corp.), cut cross section: 12×5 mm
Movement distance (one way): 30 mm
Movement speed: 1,600 mm/min
Load: 2 $kg/cm^2$
Number of reciprocations: 1,000 times

Measurement of Contact Angle

Before and after the above scratch resistance evaluation, the contact angle with water was measured under the following conditions.

Apparatus name: fully automatic contact angle meter DM700 (manufactured by Kyowa Interface Science Co., Ltd.)
Technique: sessile drop technique
Method: ellipse-fitting method
Water droplet: 20 μL
Measurement timing: 20 seconds after dropwise addition
Number of measurements: average of three-point measurements

Synthesis of (Meth)Acrylic Resin A

Into a 500 ml-flask equipped with a stirrer, a thermometer, a condenser, and a nitrogen gas inlet tube, 150 parts by mass of propylene glycol monomethyl acetate (PGMAC) was charged, and the temperature was raised to 110° C.

Separately, 25 parts by mass of dimethylacrylamide (DMAA), 35 parts by mass of polycaprolactone-modified hydroxyethyl acrylate (PLACCEL FA2D, manufactured by Daicel Corporation), 10 parts by mass of 2-hydroxylethyl methacrylate (HEMA), 5 parts by mass of polydimethylsiloxane modified with methacrylate at one terminal (Silaplane FM-0721, manufactured by JNC Corporation, molecular weight: 5,000), 25 parts by mass of methyl methacrylate, and 1 part by mass of 1,1'-azobis(cyclohexane-1-carbonitrile) (V-40, manufactured by Wako Pure Chemical Industries, Ltd.) were mixed. The mixed monomer was added dropwise to the 500 ml-flask over 2 hours with stirring, and reacted for 5 hours.

The heating was stopped and the mixture was cooled to room temperature to obtain a resin solution containing a (meth)acrylic resin A (solid content ratio: 40 mass %).

The obtained (meth)acrylic resin A had a hydroxyl value of 57 mgKOH/g, a number average molecular weight (Mn) of 12,000, a mass average molecular weight (Mw) of 44,000, and a polydispersity index (Mw/Mn) of 3.67. The glass transition temperature (Tg) of the (meth)acrylic resin A calculated from the blending ratio of the used monomers based on the above Fox's equation was 32.8° C.

Preparation of Coating Composition 1

As a solvent, a mixture was prepared by mixing 38 mass % of t-butanol, 24 mass % of diacetone alcohol, 18 mass % of methyl ethyl ketone, 10 mass % of ethyl acetate, and 10 mass % of propylene glycol monomethyl ether acetate.

The (meth)acrylic resin A obtained above (100 parts by mass), 30 parts by mass of polycaprolactone diol (PLACCEL 205U, manufactured by Daicel Corporation, molecular weight: 530, hydroxyl value: 207 to 217 mgKOH/g), and 23.5 parts by mass of a polyfunctional isocyanate compound (24A-100, manufactured by Asahi Kasei Corporation, biuret type hexamethylene diisocyanate, isocyanate group content: 23.5 mass %, solid content: 100 mass %) were mixed with the solvent to prepare a coating composition 1 having a solid content concentration of 16.5 mass %.

The amount of the (meth)acrylic resin A does not represent the amount as a resin solution (solid content: mass %), but represents the amount of the resin (solid content) contained in the resin solution. The amount of the polyfunctional isocyanate compound also represents the amount as a solid content.

The measured value of the hydroxyl value of the mixture when the (meth)acrylic resin A and the polyol compound were uniformly mixed in the above amounts was 93 mgKOH/g.

Preparation of Coating Compositions 2 to 4

Coating compositions 2 to 4 having solid content concentrations of 18.5 mass %, 20.5 mass %, and 24.5 mass %, respectively, were prepared in the same manner as in the coating composition 1 except that the amount of the solvent was changed.

Synthesis of (Meth)Acrylic Resin B

Into a 500 ml-flask equipped with a stirrer, a thermometer, a condenser, and a nitrogen gas inlet tube, 150 parts by mass of propylene glycol monomethyl acetate (PGMAC) was charged, and the temperature was raised to 110° C.

Separately, 25 parts by mass of dimethylacrylamide (DMAA), 35 parts by mass of polycaprolactone-modified hydroxyethyl acrylate (PLACCEL FA2D, manufactured by Daicel Corporation), 10 parts by mass of 2-hydroxylethyl methacrylate (HEMA), 25 parts by mass of methyl methacrylate, and 1 part by mass of 1,1'-azobis(cyclohexane-1-carbonitrile) (V-40, manufactured by Wako Pure Chemical Industries, Ltd.) were mixed. The mixed monomer was added dropwise to the 500 ml-flask over 2 hours with stirring, and reacted for 5 hours.

The heating was stopped and the mixture was cooled to room temperature to obtain a resin solution containing a (meth)acrylic resin B (solid content ratio: 40 mass %).

Preparation of Coating Composition 5

As a solvent, a mixture was prepared by mixing 38 mass % of t-butanol, 24 mass % of diacetone alcohol, 18 mass % of methyl ethyl ketone, 10 mass % of ethyl acetate, and 10 mass % of propylene glycol monomethyl ether acetate.

The (meth)acrylic resin B obtained above (100 parts by mass), 30 parts by mass of polycaprolactone diol (PLACCEL 205U, manufactured by Daicel Corporation, molecular weight: 530, hydroxyl value: 207 to 217 mgKOH/g), and 23.5 parts by mass of a polyfunctional isocyanate compound (24A-100, manufactured by Asahi Kasei Corporation, biuret type hexamethylene diisocyanate, isocyanate group content: 23.5 mass %, solid content: 100 mass %) were mixed with the solvent to prepare a coating composition 5 having a solid content concentration of 19.5 mass %.

Example 1

Using a thiourethane-based plastic lens MERIA (manufactured by HOYA Corporation, refractive index: 1.60, power: S-4.00D, thickness: 1.0 mm, outer diameter: 75 mm) as a substrate, the obtained coating composition 1 was applied onto the substrate by a dipping method (pulling speed: 5 mm/sec), then heated at a temperature of 100° C. for 20 minutes, and then allowed to cool.

Thereafter, the coated substrate was heated at 120° C. for 120 minutes to produce a spectacle lens having an antifogging layer on the substrate. The evaluation results of the obtained spectacle lens are shown in Table 1.

Examples 2 to 4

Spectacle lenses were produced by the same operation as in Example 1 except that the coating composition was changed as shown in Table 1. The evaluation results of the obtained spectacle lenses are shown in Tables 1 and 2.

Example 5

Using a thiourethane-based plastic lens MERIA (manufactured by HOYA Corporation, refractive index: 1.60, power: S-4.00D, thickness: 1.0 mm, outer diameter: 75 mm) as a substrate, the obtained coating composition 4 was applied onto the substrate by a dipping method (pulling speed: 5 mm/sec), then heated at a temperature of 100° C. for 20 minutes, and then allowed to cool (application step). This application step was performed twice.

Thereafter, the coated substrate was heated at 120° C. for 120 minutes to produce a spectacle lens having an antifogging layer on the substrate. The evaluation results of the obtained spectacle lens are shown in Table 1.

Example 6

A spectacle lens was produced by the same operation as in Example 5 except that the application step was performed three times. The evaluation results of the obtained spectacle lens are shown in Table 1.

Comparative Example 1

A spectacle lens including only a substrate of a thiourethane-based plastic lens MERIA (manufactured by HOYA Corporation, refractive index: 1.60, power: S-4.00D, thickness: 1.0 mm, outer diameter: 75 mm) was used as the spectacle lens of Comparative Example 1. The evaluation results of the spectacle lens are shown in Table 1.

Comparative Example 2

Using a thiourethane-based plastic lens MERIA (manufactured by HOYA Corporation, refractive index: 1.60, power: S-4.00D, thickness: 1.0 mm, outer diameter: 75 mm) as a substrate, the obtained coating composition 5 was applied onto the substrate by a dipping method (pulling speed: 5 mm/sec), then heated at a temperature of 100° C. for 20 minutes, and then allowed to cool.

Thereafter, the resulting substrate was heated at 120° C. for 120 minutes to form an antifogging layer on the substrate.

Next, the substrate on which the antifogging layer had been formed was immersed in pure water, and washed for 30 minutes under the conditions of 200 W and 35 kHz using an ultrasonic cleaner. The substrate taken out after washing was heated at a temperature of 80° C. for 10 minutes and dried.

Next, the dried substrate was subjected to treatment with an oxygen gas at a flow rate of 50 ml/min and 250 W for 40 seconds by a plasma treatment apparatus.

Next, the substrate on which the antifogging layer had been formed was immersed in a solution obtained by diluting a processed product of amino-modified silicone (HF-869, manufactured by Shin-Etsu Chemical Co., Ltd.) to 0.3 mass % with n-hexane, taken out, and then cured by heating at a temperature of 100° C. for 15 minutes. After curing, components excessively adhered were wiped off with acetone.

TABLE 1

| | | | Examples | | | | | | Comparative Examples | |
|---|---|---|---|---|---|---|---|---|---|---|
| | | | 1 | 2 | 3 | 4 | 5 | 6 | 1 | 2 |
| Water-absorbent coating composition | Type of water-absorbent coating composition | — | 1 | 2 | 3 | 4 | 4 | 4 | — | 5 |
| | Solid content concentration | mass % | 16.5 | 18.5 | 20.5 | 24.5 | 24.5 | 24.5 | — | 19.5 |
| | Number of applications | time | 1 | 1 | 1 | 1 | 2 | 3 | | 1 |
| Outermost layer of coating film | | | Water-absorbent antifogging layer having water repellent performance | | | | | | — | Water-repellent layer |
| Film thickness of coating layer | | μm | 5.1 | 6.7 | 9.0 | 15.3 | 25.7 | 47.5 | — | 8.0 |
| Evaluation | Fogging start time | sec | 180 | 210 | 240 | 330 | 420 | 600 | 90 | 210 |

TABLE 2

| | Example 3 | Comparative Example 2 |
|---|---|---|
| Scratch resistance | No scratch | Film is peeled off with 12 mm width at maximum |
| Contact angle (before abrasion test) | 104.7° | 104.7° |
| Contact angle (after abrasion test) | 101.3° | 63.1° |

As described above, the results of Examples and Comparative Examples show that the spectacle lens according to Examples is excellent in antifogging properties and scratch resistance.

Finally, the embodiment of the present disclosure will be summarized.

A spectacle lens according to an embodiment of the present disclosure is a spectacle lens including a substrate and a water-absorbent antifogging layer, wherein the water-absorbent antifogging layer is an outermost layer of the spectacle lens, and the water-absorbent antifogging layer contains a resin having a siloxane bonding unit.

According to the above-described embodiment, it is possible to provide a spectacle lens excellent in antifogging properties.

Each embodiment disclosed herein is an example in every respect and should not be restrictively understood. The scope of the present invention is defined not by the above description but by claims, and intends to include all modifications within meaning and a scope equal to claims.

In the present disclosure, as for the examples of components, contents, and physical properties, matters exemplified or described as a preferable range in the detailed description of the invention may be combined with each other arbitrarily.

In addition, by adjusting the composition described in Examples so as to be the composition described in the detailed description of the invention, the embodiment in the present disclosure can be performed in a similar manner to Examples in the entire claimed composition range.

The invention claimed is:

1. A spectacle lens comprising: a substrate; and a water-absorbent antifogging layer, wherein the water-absorbent antifogging layer is an outermost layer of the spectacle lens, and the water-absorbent antifogging layer contains a resin having a siloxane bonding unit, wherein the water-absorbent antifogging layer is a cured film of a coating composition containing a constituent unit derived from a siloxane compound and a constituent unit derived from acrylamide, and wherein a solid content concentration of the coating composition is 16.5 to 24.5 mass %.

2. The spectacle lens according to claim 1, wherein a film thickness of the water-absorbent antifogging layer is 6 μm or more.

3. The spectacle lens according to claim 1, wherein the water-absorbent antifogging layer is directly built up on the substrate.

4. The spectacle lens according to claim 1, wherein the water-absorbent antifogging layer has water repellent performance.

5. The spectacle lens according to claim 1, wherein the water-absorbent antifogging layer is formed of a cured film of a coating composition containing the following components (A) to (C):

Component (A): a (meth)acrylic resin (A) having a constituent unit derived from a monomer (a-1) represented by the following general formula (1), a constituent unit derived from a monomer (a-2) represented by the following general formula (2), a constituent unit derived from a hydroxyalkyl (meth)acrylate (a-3), and a constituent unit derived from a monomer (a-4) represented by the following general formula (3);

Component (B): a polyol compound (B); and

Component (C): a polyfunctional isocyanate compound (C),

[Chemical Formula 1]

(1)

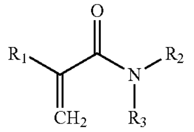

wherein $R_1$ is a hydrogen atom or a methyl group, $R_2$ and $R_3$ are each independently a hydrogen atom or an alkyl group having 1 to 3 carbon atoms, and $R_2$ and $R_3$ may be the same or different,

[Chemical Formula 2]
(2)
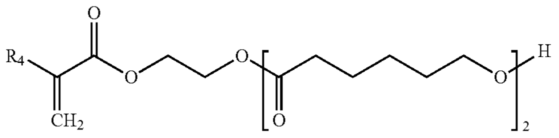
wherein $R_4$ is a hydrogen atom or a methyl group, and n is an integer of 1 to 5,
[Chemical Formula 3]
(3)
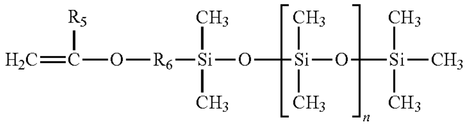
wherein $R_5$ is a hydrogen atom or a methyl group, $R_6$ is a divalent organic group, and n is 0 or an integer of 1 or more.
* * * * *